US005656369A

United States Patent [19]

Chess et al.

[11] Patent Number: 5,656,369

[45] Date of Patent: Aug. 12, 1997

[54] BUSINESS FORM HAVING INTEGRAL LABEL ASSOCIATED THEREWITH COATED WITH COMPOSITION CAPABLE OF RECEIVING TONER IMAGES THEREON, AND METHOD FOR PRODUCING SAME

[75] Inventors: Stanley C. Chess, Goffstown, N.H.; Nancy G. Mitchell, Grand Island, N.Y.

[73] Assignee: Moore Business Forms, Inc., Grand Island, N.Y.

[21] Appl. No.: 470,486

[22] Filed: Jun. 6, 1995

Related U.S. Application Data

[63] Continuation-in-part of Ser. No. 11,715, Feb. 1, 1993, Pat. No. 5,437,925, which is a continuation-in-part of Ser. No. 684,202, Apr. 12, 1991, abandoned.

[51] Int. Cl.⁶ ........ B32B 5/16

[52] U.S. Cl. ........ 428/331; 428/341; 428/342; 428/343; 428/352; 428/354; 428/537.5

[58] Field of Search ........ 428/40.1, 40.2, 428/41.3, 42.2, 42.3, 331, 343, 352, 354, 341, 342, 537.5

[56] References Cited

U.S. PATENT DOCUMENTS

| | | | |
|---|---|---|---|
| Re. 29,893 | 1/1979 | Shaw | 428/446 |
| 3,055,295 | 9/1962 | Perkins | 101/462 |
| 3,455,241 | 7/1969 | Perkins | 101/453 |
| 3,864,132 | 2/1975 | Rasch et al. | 430/496 |
| 4,110,502 | 8/1978 | Baer | 428/40 |
| 4,259,425 | 3/1981 | Serlin | 430/56 |
| 4,269,891 | 5/1981 | Minagawa | 428/335 |
| 4,379,573 | 4/1983 | Lomeli et al. | 428/42 |
| 4,425,405 | 1/1984 | Murakami et al. | 428/342 |
| 4,429,032 | 1/1984 | Matthe et al. | 430/231 |
| 4,440,827 | 4/1984 | Miyamoto et al. | 428/327 |

(List continued on next page.)

FOREIGN PATENT DOCUMENTS

| | | |
|---|---|---|
| 0121916 | 10/1984 | European Pat. Off. . |
| 0595511 | 5/1994 | European Pat. Off. . |
| 60-204390 | 10/1985 | Japan . |

OTHER PUBLICATIONS

PCT Search Report mailed Sep. 27, 1996 for PCT Application No. PCT/US96/08651.

Abstract —Database WPI, Derwent Publications, Ltd., London, United Kingdom JP-A-04298379, OJI Paper Co., Oct. 22, 1992.

Japanese Abstract —vol. 011, No. 158, dated May 22, 1987, JP-61290097, Mitsubishi Paper Mills, Ltd., Dec. 20, 1986.

Hans neschen, Neschen International, brochure, 1977, 1978.

Abstract No. 4173, Miyamoto, Japanese Patent Kokai 204, 390, ABIPC vol. 57, No. 3 (Sep., 1986), p. 460.

*Primary Examiner*—H. Thi Le

*Attorney, Agent, or Firm*—Finnegan, Henderson, Farabow, Garrett & Dunner

[57] ABSTRACT

Business forms having labels integral with the sheets thereof (rather than riding piggyback thereon) are produced by applying a strip of transfer tape to only a portion of the second face of a sheet, with the adhesive of the transfer tape contacting the sheet, so that sheet material surrounds the transfer tape strip completely. Then a label is die cut from the first face of the sheet, preferably after the transfer tape is applied, within the area of the sheet overlying the transfer tape strip, without cutting the transfer tape backing. A coating of less than 2.0 g/m$^2$ is applied to a portion of the first face of the sheet in an area including the label. The coating is a composition including from about 50 to about 90 parts of a particulate silica and about 10 to about 50 parts of a polyvinyl alcohol, by dry weight. Indicia is at some point printed or bar coded on the first face of the sheet. The label may be readily removed, with the adhesive from the transfer tape sticking to the label while the backing of the transfer tape remains in place. The strip of transfer tape is cut from a web, and then is transported with the adhesive face outward by a vacuum cylinder, until it moves into contact with a moving web. The web is ultimately formed into individual or continuous business forms, which may be multi-ply.

6 Claims, 2 Drawing Sheets

U.S. PATENT DOCUMENTS

| | | | |
|---|---|---|---|
| 4,474,847 | 10/1984 | Schröder et al. | 428/323 |
| 4,478,910 | 10/1984 | Oshima et al. | 428/331 |
| 4,562,140 | 12/1985 | Kohmura et al. | 430/244 |
| 4,617,239 | 10/1986 | Maruyama et al. | 428/452 |
| 4,636,410 | 1/1987 | Akiya et al. | 427/261 |
| 4,755,396 | 7/1988 | Geisler et al. | 427/197 |
| 4,758,461 | 7/1988 | Akiya et al. | 428/212 |
| 4,770,934 | 9/1988 | Yamasaki et al. | 428/331 |
| 4,799,712 | 1/1989 | Biava et al. | 282/1 A |
| 4,820,682 | 4/1989 | Shimomura | 503/207 |
| 4,821,439 | 4/1989 | Wilck | 40/638 |
| 4,854,610 | 8/1989 | Kwiatek | 282/11.5 A |
| 4,890,862 | 1/1990 | Buchholz | 283/62 |
| 4,891,285 | 1/1990 | Page et al. | 430/14 |
| 4,900,620 | 2/1990 | Tokita et al. | 428/330 |
| 4,910,058 | 3/1990 | Jameson | 428/42 |
| 4,942,410 | 7/1990 | Fitch et al. | 346/135.1 |
| 4,978,415 | 12/1990 | Jones | 156/517 |
| 4,983,438 | 1/1991 | Jameson | 428/42 |
| 5,011,559 | 4/1991 | Felix | 156/257 |
| 5,031,938 | 7/1991 | Instance | 283/81 |
| 5,061,334 | 10/1991 | Paules | 156/235 |
| 5,126,010 | 6/1992 | Kobayashi et al. | 162/135 |
| 5,129,682 | 7/1992 | Ashby | 283/81 |
| 5,203,851 | 4/1993 | Browning et al. | 283/81 |
| 5,270,103 | 12/1993 | Oliver et al. | 428/219 |

FIG.2
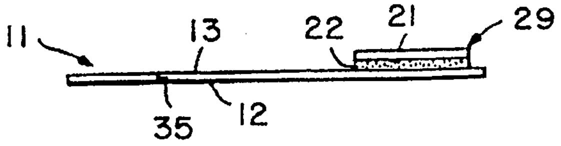
FIG.3
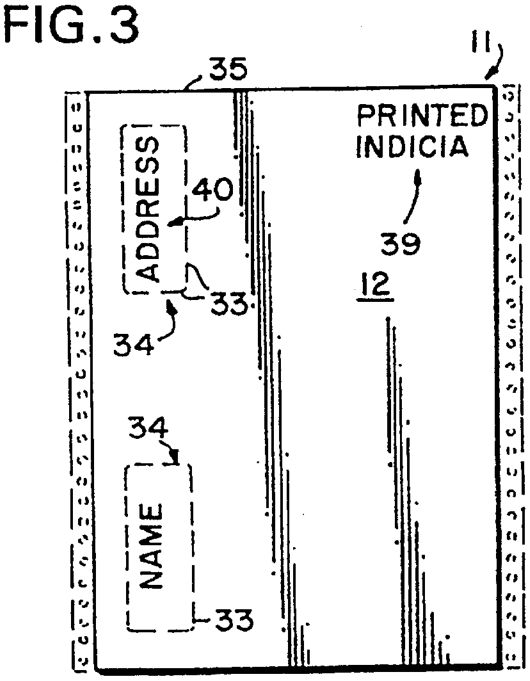
FIG.4
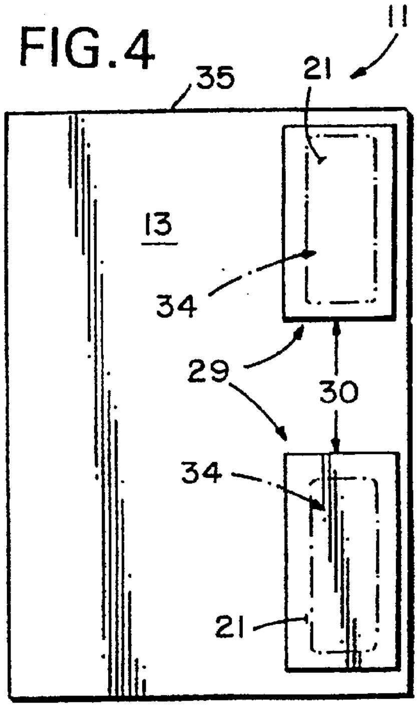
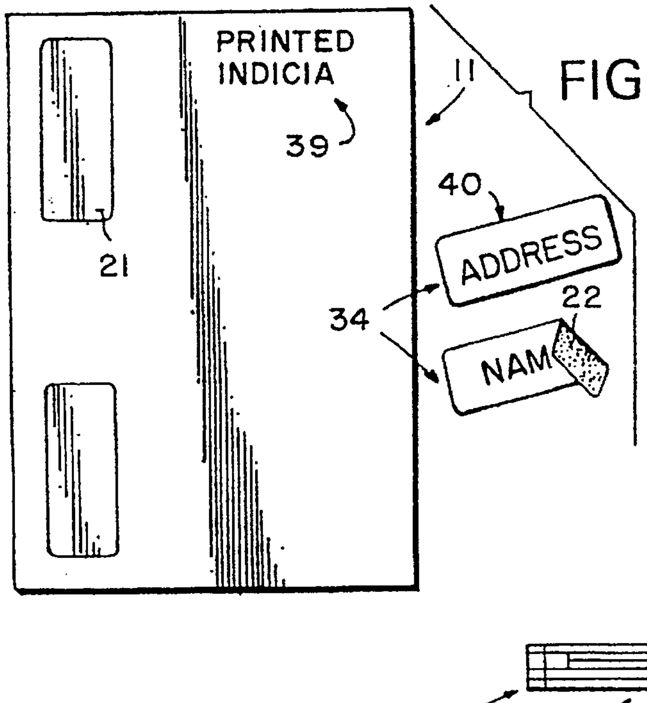
FIG.5
FIG.6
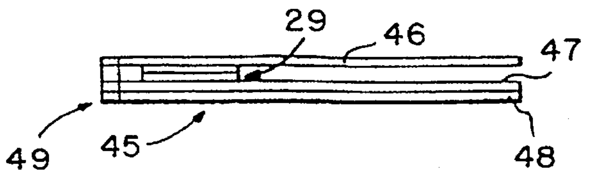

BUSINESS FORM HAVING INTEGRAL LABEL ASSOCIATED THEREWITH COATED WITH COMPOSITION CAPABLE OF RECEIVING TONER IMAGES THEREON, AND METHOD FOR PRODUCING SAME

RELATED APPLICATIONS

This application is a continuation-in-part of U.S. application Ser. No. 08/011,715, filed Feb. 1, 1993, now issued as U.S. Pat. No. 5,437,925, which was a continuation-in-part of application Ser. No. 07/684,202, filed Apr. 12, 1991, now abandoned.

BACKGROUND OF THE INVENTION

1. Field of the Invention

The present invention is directed to a business form having an integral label associated therewith that is capable of receiving toner images without flaking or smearing. The invention is also directed to a particular method for making such a business form.

2. Description of the Prior Art

In the manufacture of business forms, there are many circumstances in which it is desirable to form an integral, but ultimately separable, self-adhesive label as a part of one or more sheets of the business form. There are also many circumstances in which it is desirable to print or bar code on the self-adhesive label. It is highly desirable that this printing or bar coding not flake off or smear, particularly in warehousing and inventory control applications.

The use of electrographic means to produce a variety of images for different applications is continuing to expand. Examples of the imaging technologies being employed include electrophotography, magnetography, electrostatics, ink jet, thermal transfer, etc. The materials used to generate the visible images can be dry or liquid toners or aqueous-based, solvent-based or hot melt-based inks. The imaging materials may be fused to the substrate by heat, pressure, a combination thereof or by solvation in the case of toners. There is a need for improved adhesion of toners to substrates to prevent smudging, smearing and flaking of the image encountered in subsequent handling.

In general, paper is used as the imaging substrate in these systems. It has been found that the degree of fuse quality varies with the grade and source of paper used. Also, it is sometimes desirable to image on substrates other than paper such as plastic films, metal foils or textiles.

Prior art uses of coated paper have primarily been directed to ink jet recording uses. Polymeric binders and pigments or particulate silica have been used to form coated substrates for ink jet recording paper and optical bar code printing. Generally, the coatings applied have been in a coating weight of greater than 2 g/m$^2$ per side of the substrate.

There exists a need for a business form having an integral label associated therewith that is capable of providing improved adhesion of toners and will resist smudging, smearing and flaking of the toner image in subsequent handling.

The present inventors have found that an integral label on a business form that is coated with a dispersion of particulate silica and a polyvinyl alcohol binder to a coating weight of less than 2 g/m$^2$ per side of the substrate provides improved adhesion of toner and reduced smudging, smearing and flaking when using a number of varied substrates including paper, plastic films, metal foils and textiles.

SUMMARY OF THE INVENTION

To achieve the advantages and in accordance with the purpose of the invention, as embodied and broadly described herein, a method of producing a business form having an integral label (or a plurality of labels) associated therewith is provided utilizing a sheet having a Stockigt sizing degree greater than 25 seconds, a first face capable of receiving printing thereon, and a second face having a greater affinity for transfer tape adhesive than does transfer tape backing. Transfer tape is a relatively-inexpensive and commonly-available product that is readily utilized to form the labels according to the invention.

According to the method of the invention, in acting on a sheet (e.g., in web form) of paper having first and second faces, the following steps are practiced: (a) applying a strip of transfer tape to only a portion of the second face of the sheet with the transfer tape adhesive contacting the sheet, so that sheet material completely surrounds the transfer tape strip; (b) before or after step (a), die cutting a label on a portion of the first face of the sheet within the area of the sheet overlying the transfer tape strip on the second face of the sheet (If step (b) does come before step (a), then the die cut may include small ties to hold the label in place); (c) applying a coating of less than 2.0 g/m$^2$ to a portion of the first face of the sheet in an area including the label, wherein said coating comprises a composition including from about 50 to about 90 parts of a particulate silica and about 10 to about 50 parts of a polyvinyl alcohol, by dry weight; and, (d) printing or bar coding indicia on the coated portion of the first face of the sheet.

Step (d) may be practiced before steps (a) and (b), or between steps (a) and (b). Initially, the sheet may be in continuous format, that is, in the form of a web of paper, during the practice of steps (a) through (c), and, if so, there is the further step (e) of separating the web into individual sheets, each individual sheet containing at least one label. Step (a) may be practiced by: (i) cutting a strip of transfer tape from a web of transfer tape; and (ii) transporting the strip to the sheet with adhesive facing outwardly, and applying the strip to the second face of the sheet, using a vacuum cylinder. Step (b) may be practiced by die cutting a label from completely within the area of the sheet overlying the transfer tape.

To utilize the integral label formed according to the invention, it is merely necessary to remove it from the form by peeling it away from the transfer tape backing, the adhesive of the transfer tape remaining with the label, i.e., separating from the transfer tape backing.

The invention also relates to a single part, or multipart, business form having an integral label associated therewith that is capable of receiving toner images without flaking or smearing. The business form of the invention includes a sheet having a Stockigt sizing degree greater than 25 seconds, a first face capable of receiving printing thereon, and a second face having a greater affinity for transfer tape adhesive than transfer tape backing. The form also includes a strip of transfer tape applied to a portion of the second face of the sheet, with the transfer tape adhesive contacting the sheet, so the sheet material completely surrounds the transfer tape strip. The form further includes a label die cut from a portion of the first face of the sheet within the area of the sheet ultimately overlying the transfer tape strip on the second face of the backing sheet. A coating of less than 2.0 g/m$^2$ is applied to a portion of the first face of the sheet in an area including the label. The coating is a toner receptive composition including from about 50 to about 90 parts of a particulate silica and about 10 to about 50 parts of a polyvinyl alcohol, by dry weight.

The accompanying drawings are included to provide a further understanding of the invention and are incorporated in and constitute a part of this specification, illustrate several embodiments of the invention and together with the description help to explain the principles of the invention.

BRIEF DESCRIPTION OF TEE DRAWINGS

FIG. 2 is an end view of an exemplary business form produced according to the invention, with the thickness of the components greatly exaggerated for clarity of illustration;

FIGS. 3 and 4 are top and bottom views, respectively, of a business form like that of FIG. 2;

FIG. 5 is a view like that of FIG. 3 only showing the labels removed; and

FIG. 6 is a side view of an exemplary multipart business form produced according to the present invention, with the thickness of the components greatly exaggerated for clarity of illustration.

DETAILED DESCRIPTION OF TEE INVENTION

Figure 1:
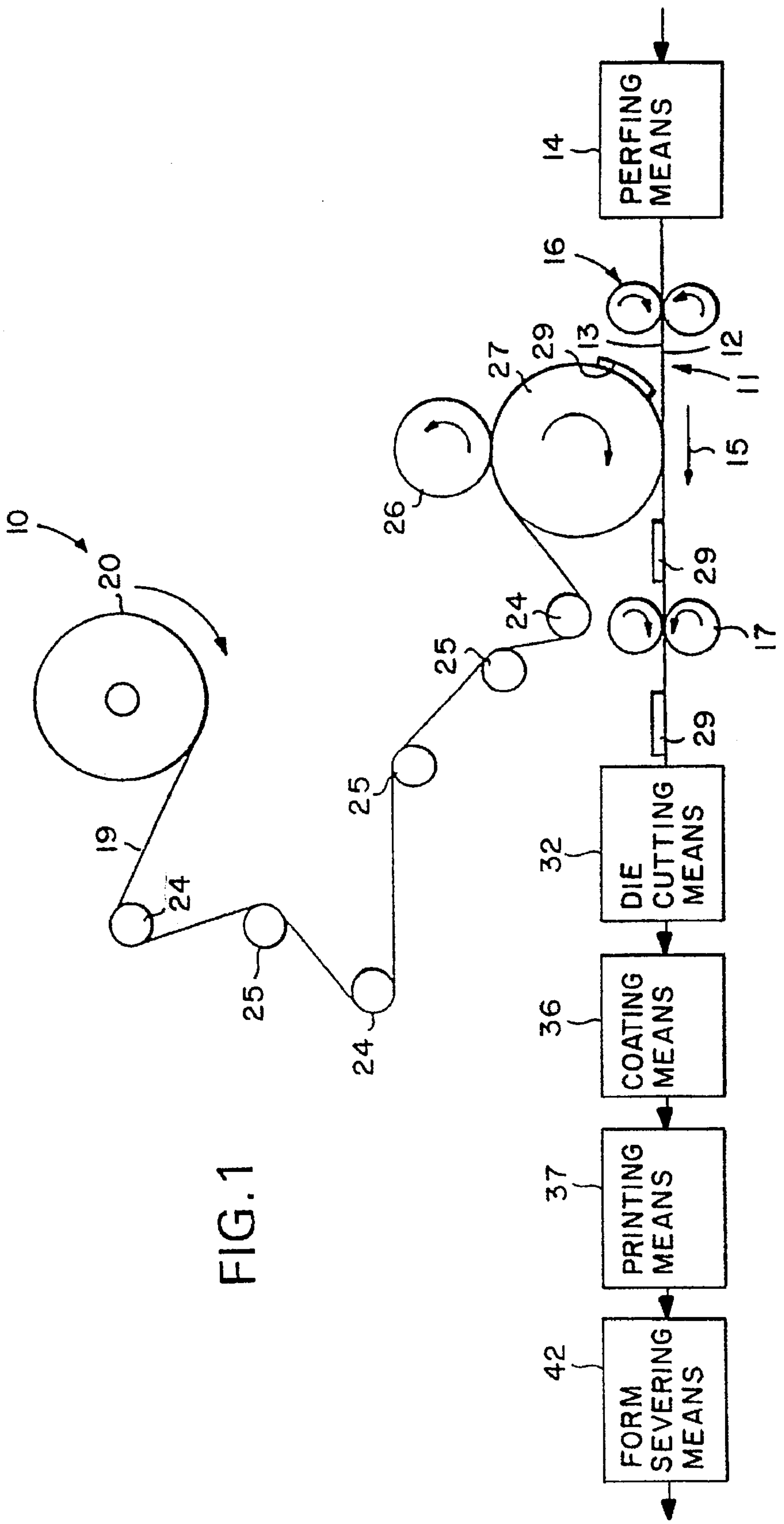
FIG. 1 is a schematic view of exemplary apparatus for producing business forms of the present invention.

Exemplary apparatus for practicing exemplary methods according to the present invention is illustrated generally at 10 in FIG. 1. The apparatus 10 acts on a sheet 11, which typically is in the form of a web having a first face 12 and a second face 13, the web ultimately formed into individual business forms at some stage in the processing. Sheet 11 typically is of bond paper, although it may be of other sheet material having desired characteristics. If desired, conventional perfing means 14 may be provided at the upstream-most portion of sheet 11 which moves in the direction 15, to form individual forms from sheet 11.

Means are provided for transporting sheet 11 in direction 15. Such transporting means typically comprise a plurality of pairs of powered tractors, as indicated schematically at 16 and 17 in FIG. 1.

In order to provide a label integral with sheet 11, according to the present invention, conventional transfer tape 19, which is taken off from a tape roll 20, is cut into strips which are then applied, in spaced relationship, to second face 13 of sheet 11. To accomplish this, conventional transfer tape 19—which includes a backing 21 and an adhesive 22 on one face thereof (see FIG. 2)—is taken off of roll 20 with the adhesive face outward. Transfer tape 19 is then fed by a plurality of rollers, including rollers 24 which have the surfaces thereof coated with a release material (such as a silicone-coating) so that adhesive 22 from transfer tape 19 will not adhere thereto, and also guided by other rollers 25, is ultimately fed to a cut-off cylinder 26 cooperating with a vacuum cylinder 27. Cut-off cylinder 26 cuts transfer tape 19 into individual transfer tape strips 29, as seen in FIGS. 1, 2 and 4, which are applied to second face 13 of sheet 11. Second face 13 has a higher affinity for adhesive 22 of transfer tape strips 29 than does backing 21. Virtually all typical bond papers have such affinity.

The basic apparatus 10 may comprise a conventional Tamarack labelling machine, available from Tamarack Products, Inc. of Waconda, Ill., modified to have silicone-coated rollers 24 and a die-cutting means 32. Cut-off cylinder 26 cooperates with a vacuum cylinder 27, with vacuum cylinder 27 forming an anvil for cut-off cylinder 26. The bearing for mounting vacuum cylinder 27 (and cut-off cylinder 26) with respect to transporting means 16, 17, mounts vacuum cylinder 27 so that transfer tape strips 29 are applied to second face 13 as sheet 11 moves in direction 15.

When a transfer tape strip 29 is applied to second face 13 of sheet 11, transfer tape strip 29 is completely surrounded by sheet 11 as seen in FIG. 4, and transfer tape strips 29 are spaced from each other—as indicated by reference numeral 30 in FIG. 4—in direction 15. Typically only one transfer tape strip 29 may be provided for each sheet 11 that ultimately is formed into an individual business form; however, two (or even more) transfer tape strips 29 may be provided in association with one sheet 11 if desired.

Spaced from vacuum cylinder 27—shown downstream in direction 15—die-cutting means 32 (see FIG. 1) is preferably provided. Die cutting means 32 may alternatively be upstream of vacuum cylinder 27 (in which case the die cut then formed should include small ties to hold the label in place for subsequent processing). The conventional die-cutting means 32 acts on first face 12 to cut through the material forming sheet 11 to cut a label out of sheet 11. However, die-cutting means 32 does not cut backing 21 of the transfer tape. As seen in FIG. 3, die-cut separation lines are illustrated by reference numeral 33, and the labels formed therefrom are illustrated by reference numeral 34. The die-cut lines 33 are positioned so that they overlie backing 21 of transfer tape strips 29. Typically, die-cut lines 33 are completely within the area of transfer tape backing 21, at least at the "top" and "bottom" of sheet 11 (the "top" or leading edge of sheet 11 is shown by reference numeral 35 in FIGS. 3 and 4), and preferably also along the side edges too.

A printing means 37 is also associated with the other apparatus of FIG. 1. Printing means 37 prints first face 12 of sheet 11, first face 12 being receptive to printing (as virtually all bond paper is). The indicia printed thereon is seen at 39 in FIGS. 3 and 5, and also typically includes indicia 40 on the labels 34. Printing means 37 may be positioned as illustrated in FIG. 1, but preferably is disposed before vacuum cylinder 27, or between vacuum cylinder 27 and die cutting means 32.

Where, as is typical, sheet 11 is in continuous form during the performance of these operations, an individual form-severing means 42—see FIG. 1—may be provided downstream of the rest of the components (e.g. 27, 32, 37). Alternatively, the forms could be delivered in continuous format and separated by the ultimate user.

When sheets 11 are utilized according to the invention, it is merely necessary to separate labels 34 from the rest of sheet 11 at die-cut lines 33. Because labels 34 have a higher affinity for adhesive 22 than does backing 21, backing 21 remains (see FIG. 5) while labels 34 have adhesive 22 on the back thereof, as illustrated for the lowermost of separated labels 34 in FIG. 5.

During conventional processing, other conventional techniques and mechanisms may also be utilized, such as the removable tractor drive strips shown in dotted line on the opposite sides of the sheet 11 in FIG. 3.

Also, multipart forms may be produced. FIG. 6 illustrates a multipart form 45 produced according to the invention. In the multipart form illustrated in FIG. 6, the top component 46 (or an interior ply of the form, such as the second ply of a three ply construction) comprises paper with transfer tape strip 29 on the back thereof and a label (not shown but like labels 34) formed on the top thereof. A number of additional sheets 47, 48 which may be connected together—as indicated at 49 at one end thereof—are also provided, in any desired order. Alternatively, instead of the construction as illustrated in FIG. 6, each of plys 46 through 48 may have an integral label or labels associated therewith.

In the utilization of apparatus 10, transfer tape strips 29 are applied to a portion of second face 13 of sheets 11 so that transfer tape adhesive 22 contacts second face 13 of sheet 11 and so that sheet material surrounds transfer tape strips 29. After this step, the individual integral labels 34 are die-cut from first face 12 of sheet 11 within the area of the sheet overlying transfer tape strip 29 on second face 13, without cutting the transfer tape backing. Indicia 39 is printed on first face 12, typically downstream of the vacuum cylinder which applies transfer tape strips 29. Printing may also be done upstream of perfing means 14.

It will thus be seen that according to the present invention, a simple, yet effective, method has been provided, as well as a business form with integral label produced thereby, utilizing only simple equipment and readily available components to construct the business form.

In accordance with the invention, as embodied and broadly described herein, the integral label of the business form of the invention is coated by coating means 36 (FIG. 1) with a composition allowing the label to receive printed indicia without flaking or smearing. Specifically, a portion of the first face of the sheet includes a coating composition obtained from a coating formulation comprising a particulate silica, water and a polyvinyl alcohol binder. As used herein, coating formulation refers to the mixture that is initially applied to the substrate, while coating composition refers to the coating after application and drying.

The coating formulation comprises about 25 to 45 parts by weight of particulate silica, about 10 to 50 parts by weight of an aqueous polyvinyl alcohol binder and about 25 to 45 parts by weight water. The water content may vary widely while maintaining the silica and binder contents within the above ratio. The resulting coating composition may vary from about 50 parts to up to 90 parts silica by dry weight and from about 10 parts to about 50 parts by dry weight polyvinyl alcohol binder.

A preferred coating formulation comprises about 25–45% of a 20% solids dispersion of particulate silica, more preferably 36% in water, about 10–50% of a 10% solution of partially hydrolyzed polyvinyl alcohol, more preferably 28%, and about 25–45% water, more preferably 36%. Alternatively, the particulate silica may be a 12% solids dispersion.

Additional water or some other polar solvent may be added to the coating composition of the invention to adjust viscosity to that most suitable for the coating process used. Suitable polar solvents include alcohols such as isopropanol, ethanol, butanol and mixtures thereof. Other additives may also be included, for example, biocides such as Nalco 7620 WB, which is an aqueous solution of methylene bis thiocyanate and ethylene glycol (available from Nalco Chemical Co., Naperville, Ill.), defoamers such as polyglycols Nalco 2311, 2340 or 2308 (Nalco Chemical Co.), slip agents such as zinc stearate, calcium stearate and stearamide or anti-offset compounds such as wheat starch, pea starch and cellulose fibers.

The coating composition according to the present invention is particularly useful in toner imaging. The coating composition provides improved adhesion to substrates to prevent smudging, smearing and flaking of the toner image. The coating composition may be applied to any of the commonly known substrates such as paper, plastic films, metal foils or textiles. Specific applications include financial documents or titles which require a very high degree of security to prevent image alteration, and also documents which require resistance to subsequent handling to prevent rub, smear, flaking, crease, erasure, tape pick, and scratch.

In accordance with the invention, the coating formulation may be applied by spot coating using conventional techniques such as flexo, gravure, reverse roll, X-web, etc. Drying of the coating may be effected by conventional means such as hot air convection, microwave, radio frequency or infrared. When using coated paper of the invention in a laser printer, it is desirable that the moisture content of the paper range from 4.2–5%, to avoid the paper being too conductive (water content too high) or a buildup of static electricity (water content too low).

In accordance with the invention, the coating step can be performed before steps (a) and (b) of the method of the invention, before step (b) and after step (a), before step (a) and after step (b), or after steps (a) and (b).

In accordance with the invention, the coating composition can be applied to a portion of the first face of the sheet so that the coating completely overlays the label. Alternatively, the coating can be applied to only a portion of the label.

The coating of the invention can optionally include a sizing agent (size). The size is preferably composed predominantly of starch, but can incorporate other fillers or additives such as, for example, calcium carbonate, clay, titanium dioxide, polyvinyl alcohol, styrene acrylic polymers, styrene maleic anhydrides, melamine formaldehyde resins, glyoxal, zirconium salts or quaternized amides. The size can be acidic, alkaline or neutral.

The coating composition of the invention is applied to a coat weight of less than 2.0 grams per square meter per side of substrate, preferably between 0.8 and 1.6 g/m$^2$ per side of the substrate, and more preferably about 1.1 or 1.2 g/m$^2$. The coating weight is preferably applied in a single coating step. It has been found by the inventors that, at coating weights substantially greater than 2.0 g/m$^2$ fuse (toner adherence when subjected to folding and scratching) deteriorates, pencil receptivity is poor, and the coefficient of friction increases making feeding to printers and stackers more difficult.

Particulate silicas that can be used in the invention include, for example, CAB-O-SPERSE® II, CAB-O-SPERSE® A-205, CAB-O-SPERSE® A-105, CAB-O-SPERSE® P-1175, CAB-O-SPERSE® S-109, CAB-O-SPERSE® P-1010 (available from Cabot Corporation, Cab-O-Sil Division, Tuscola, Ill.) and Aerosil 130, Aerosil 200 and Aerosil MOX80, available from Degussa Corp., Ridgefield Park, N.J. CAB-O-SPERSE® II, CAB-O-SPERSE® S-109 and CAB-O-SPERSE® A-205, each of which is an aqueous slurry of colloidal, fumed, synthetic silica, are preferred. CAB-O-SPERSE® II is a 20% dispersion of silica in water, the silica having a pH of 9.0 to 10.5. CAB-O-SPERSE® S-109 is also a 20% dispersion of silica in water, the silica having a pH of 5.0 to 5.5. CAB-O-SPERSE® A-205 is a 12% dispersion of silica in water, the silica having a pH of 5.0 to 5.5. A particulate silica is preferably utilized that has a uniformity number n for the Rosin-Rammler distribution ranging from 1.0–2.6.

The preferred particulate silicas useful in the present invention have a specific surface area ranging from 90–270 m$^2$/g as measured by the BET method. The preferred particulate silicas have a particle size ranging from about 0.5 to about 10 microns.

The polyvinyl alcohol that can be used in the invention is not limited but preferred is a 10% aqueous solution of Vinol 540, which is a partially hydrolyzed (87–89%) polyvinyl alcohol (available from Air Products and Chemicals, Inc., Allentown, Pa.).

The substrate to which the coating composition is applied is not limited but generally will be paper that is wood pulp based having a Stockigt sizing degree of greater than about 25 seconds and a basis weight ranging from about 16 to 32 pounds, preferably about 24 pounds.

A particularly preferred composition for the coating of the invention is:

| Material | Weight percent |
|---|---|
| CAB-O-SPERSE II | about 36 |
| Water | about 36 |
| 10% Vinol 540 | about 28 |
| Nalco 2311 | 0.035 |
| Nalcon 7620-WB | 0.023 |

The present invention will be described more completely with reference to the following examples, which in no case may be regarded as limiting the invention.

EXAMPLE 1

A coating formulation as follows:

| | |
|---|---|
| CAB-O-SPERSE S-109 (silica) | 35.95% |
| 10% Vinol 540 (binder) | 28.10% |
| Water | 35.95% |

was pattern-coated on one side of 24# OCR bond on a flexo coater to a coat weight of 1.1 g/m$^2$/side and a moisture content of 5%. A patch of transfer tape was applied on the opposite side of the pattern coated area and the form was die cut in the area of the transfer tape patch/coating to form an integral label. The roll was converted to both continuous and cut sheet product, preprinted with heat set inks and tested along with the uncoated base sheet on the following copiers and printers:

Xerox 1090, Xerox 5052,Xerox 9700 (all dry toner hot roll fusers);

STC 6100 (dry toner, cold vapor fusing); and

Ion Deposition (dry toner, cold pressure fusing).

Fuse quality was rated in the areas of crease resistance and tape pick up. In every case, fuse quality of the coated sheet was superior to that of the uncoated sheet. See Table 1, below.

EXAMPLE 2

The method according to Example 1 was repeated except that the coating formulation was applied as a 1" by 5" spot with a 110 anilox roll on a conventional flexo press on 24# OCR bond and then dried with an RF dryer.

The results obtained are set forth in Table 1, below.

EXAMPLE 3

The method of Example 2 was repeated except the formulation was coated onto the face of a label stock having a 60# OCR facestock and 50# release liner.

The results obtained are set forth in Table 1, below.

EXAMPLE 4

The method of Example 2 was repeated except the formulation was coated onto the back of the release liner of a label having a 60# OCR facestock and 50# release liner.

The results obtained are set forth in Table 1, below.

EXAMPLE 5

A coating formulation as follows:

| | |
|---|---|
| 12% CAB-O-SPERSE ® A-205 | 60 pts. |
| 10% Vinol 540 | 28 pts. |
| Water | 12 pts. |

was coated onto the face of a label stock having a 60# OCR facestock and 50# release liner. The coating formulation was applied at 1.1 g/m$^2$ with a 120 anilox roll on a conventional press.

The results obtained are set forth in Table 1.

EXAMPLE 6

A coating formulation as follows:

| | |
|---|---|
| 20% CAB-O-SPERSE ® S-109 | 35.95% |
| 10% Vinol 540 | 28.10% |
| Water | 35.95% |

was coated onto the face of a label stock having a 3 mil polyester facestock and a 40# liner. The coating formulation was applied at 1.1 g/m$^2$ with a 200 anilox roll on a conventional press.

The results obtained are set forth in Table 1.

Test Method for Measuring the Toner Anchorage/Adhesion

To evaluate the toner anchorage properties the following procedure was used.

Tape Pick-Up

A 4" strip of Magic tape (3M brand scotch tape) was applied to the printed area to be tested using light finger pressure. Medium finger pressure was then applied back and forth over the taped area for a total of 10 passes. The end was grasped and the tape was slowly peeled from the printed area.

Magic tape was lightly applied to another test area and carefully removed and placed on the record sheet.

Crease

The substrate was folded inward and creased in the printed area. The substrate was unfolded and scratched in the folded area using light pressure.

Calculations

The printed product toner anchorage/adhesion was rated on a scale from 1 to 6, 1 being the best. The evaluation was subjective and depended upon the before and after testing appearance of the image.

The breakdown of the scale is as follows:

1—No toner loss
2—Slight toner loss detected only on tape-product good
3—Visible toner loss from image-product marginal
4—Moderate toner loss from image-product below standard
5—Heavy toner loss, flaking or image damage-product failure
6—No toner adherence to the substrate-product failure far beyond that rated as 5

TABLE 1

| | Image | Fuse | | Adhesion | |
|---|---|---|---|---|---|
| Equipment | Material | Method | Substrate | Crease | Tape |
| Xerox 1090 | 2-C toner | hot roll | 24# Bond | 4 | 3 |
| | | | Ex. 1 | 1 | 1 |
| | | | Ex. 2 | 1 | 1 |

TABLE 1-continued

| Equipment | Image Material | Fuse Method | Substrate | Adhesion Crease | Adhesion Tape |
|---|---|---|---|---|---|
| | | | uncoated FS | 5 | 4 |
| | | | uncoatedRel | 6 | 6 |
| | | | Ex. 3 | 1 | 1 |
| | | | Ex. 4 | 1 | 1 |
| | | | Ex. 5 | 1 | 1 |
| Xerox 5052 | 2-C toner | hot roll | 24# Bond | 3 | 3 |
| | | | Ex. 1 | 1 | 1 |
| | | | Ex. 2 | 1 | 1 |
| | | | uncoated FS | 5 | 4 |
| | | | uncoatedRel | 6 | 6 |
| | | | Ex. 3 | 1 | 1 |
| | | | Ex. 4 | 1 | 2 |
| Xerox 9700 | 2-C toner | hot roll | 24# Bond | 3 | 3 |
| | | | Ex. 1 | 1 | 1 |
| STC 6100 | 2-C toner | vapor | 24# Bond | 2 | 3 |
| | | | Ex. 1 | 1 | 1 |
| IBM 3836 | 2-C toner | hot roll | 24# Bond | 5 | 4 |
| | | | Ex. 1 | 1 | 1 |
| Delphax 2460 | MC toner | pressure | 24# Bond | 4 | 5 |
| | | | Ex. 1 | 2 | 1 |
| QMS-CF 2215 | | flash fusion | 2 mil. polyester | 6 | 6 |
| | | | Ex. 6 | 1 | 1 |

uncoated FS = Uncoated facestock (control)
uncoatedRel = Uncoated release (control)

It will be apparent to those skilled in the art that various modifications and variations can be made to the present invention and in construction of this invention without departing from the scope or spirit of the invention. Other embodiments of the invention will be apparent to those skilled in the art from consideration of the specification and practice of the invention disclosed herein. It is intended that the specification, examples and drawings be considered as exemplary only, with a true scope and spirit of the invention being indicated by the following claims.

What is claimed is:

1. A business form having an integral label associated therewith that is capable of receiving toner images without flaking or smearing, said business form comprising:

at least one sheet having a Stockigt sizing degree greater than 25 seconds, a first face capable of receiving printing thereon, and a second face having a greater affinity for transfer tape adhesive than transfer tape backing;

a strip of transfer tape having a backing and an adhesive on one side of the backing, said transfer tape applied to a portion of the second face of the sheet with the transfer tape adhesive contacting the sheet, so the sheet material completely surrounds the transfer tape strip;

at least one label die cut from a portion of the first face of the sheet within the area of the sheet ultimately overlying the transfer tape strip on the second face of the backing sheet;

a coating of less than 2.0 g/m$^2$ applied to a portion of the first face of the sheet in an area including the label, said coating comprising a toner receptive composition including from about 50 to about 90 parts of a particulate silica and about 10 to about 50 parts of a polyvinyl alcohol, by dry weight;

wherein said coated label is capable of receiving toner images without flaking or smearing.

2. The business form of claim 1 comprising a plurality of sheets, at least one sheet including at least one label and transfer tape.

3. The business form of claim 2, each of said plurality of sheets including at least one label and transfer tape.

4. The business form of claim 3, wherein each of said plurality of sheets comprises a plurality of labels within the area of the sheet ultimately overlying the transfer tape strip.

5. The business form of claim 1, wherein said coating completely overlies the label.

6. The business form of claim 1, wherein said coating is applied to only a portion of the label.

* * * * *